US009939597B2

(12) United States Patent
Lavoie et al.

(10) Patent No.: US 9,939,597 B2
(45) Date of Patent: Apr. 10, 2018

(54) STANDARDIZED HOT-PLUGGABLE TRANSCEIVING UNIT WITH A CHIPSET MECHANICALLY ANCHORED AND ELECTRICALLY CONNECTED TO A BOARD

(71) Applicant: EMBRIONIX DESIGN INC., Laval (CA)

(72) Inventors: Renaud Lavoie, Laval (CA); Eric Dudemaine, Crabtree (CA)

(73) Assignee: EMBRIONIX DESIGN INC., Laval (CA)

( * ) Notice: Subject to any disclaimer, the term of this patent is extended or adjusted under 35 U.S.C. 154(b) by 290 days.

(21) Appl. No.: 14/683,534

(22) Filed: Apr. 10, 2015

(65) Prior Publication Data
US 2016/0299300 A1    Oct. 13, 2016

(51) Int. Cl.
*H04B 1/38* (2015.01)
*G02B 6/42* (2006.01)

(52) U.S. Cl.
CPC ......... *G02B 6/4261* (2013.01); *G02B 6/4246* (2013.01); *G02B 6/4278* (2013.01)

(58) Field of Classification Search
CPC .................................................. G02B 6/4261
USPC ............................................................ 375/219
See application file for complete search history.

(56) References Cited

U.S. PATENT DOCUMENTS

| 6,862,206 B1* | 3/2005 | Carter | B82Y 10/00 365/118 |
| 6,867,964 B1* | 3/2005 | Farmer | G06F 1/184 361/679.57 |
| 6,969,280 B2 | 11/2005 | Chien et al. | |
| 7,452,216 B2 | 11/2008 | Murr et al. | |
| 2011/0066909 A1* | 3/2011 | Skirmont | H04B 10/40 714/746 |
| 2011/0219067 A1* | 9/2011 | Bernosky | H04L 29/12066 709/203 |
| 2013/0077968 A1 | 3/2013 | Yang | |
| 2013/0251052 A1* | 9/2013 | Tang | H04L 25/03878 375/259 |

(Continued)

FOREIGN PATENT DOCUMENTS

CN    103576258 A    2/2014

*Primary Examiner* — Lihong Yu
(74) *Attorney, Agent, or Firm* — IP Delta Plus Inc.

(57) ABSTRACT

A standardized hot-pluggable transceiving unit comprising a housing, a board and a chipset. The housing has specific standardized dimensions and is adapted to being inserted into a chassis of a hosting unit. The board and chipset are in the housing. The board comprises at least two electro-mechanical components. The chipset also comprises at least two electro-mechanical components. Each electro-mechanical component of the chipset collaborates with a corresponding electro-mechanical component of the board for simultaneously providing a mechanical anchor and an electrical connection between the chipset and the board. The chipset further comprises a programmable processing component for processing a signal transmitted by the board via the electrical connection between the board and the chipset. For instance, the programmable processing component of the chipset comprises a coding module for encoding or decoding data having a first form into data having a second form.

19 Claims, 14 Drawing Sheets

(56) References Cited

U.S. PATENT DOCUMENTS

2014/0052852 A1\* 2/2014 Dufour .................. H04L 43/10
709/224
2014/0270755 A1\* 9/2014 Schmitz ............. H04B 10/0795
398/26

\* cited by examiner

STANDARDIZED HOT-PLUGGABLE TRANSCEIVING UNIT WITH A CHIPSET MECHANICALLY ANCHORED AND ELECTRICALLY CONNECTED TO A BOARD

TECHNICAL FIELD

The present disclosure relates to the field of standardized hot-pluggable transceiving units. More specifically, the present disclosure relates to a standardized hot-pluggable transceiving unit with a chipset mechanically anchored and electrically connected to a board.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a mother board, a card or a backplane leading to further components, via a back interface of the SFP unit. Specification no INF-8074i Rev 1.0, entitled "SFP (Small Form-factor Pluggable) Transceiver, dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, etc. However, such SFP units lack the capability to easily adapt their signal processing capabilities, by having generic components providing a common base of SFP functionalities and dedicated components for customizing the SFP units to perform dedicated signal processing tasks.

Therefore, there is a need for a new standardized hot-pluggable transceiving unit with a chipset mechanically anchored and electrically connected to a board, the chipset providing dedicated signal processing capabilities.

SUMMARY

The present disclosure provides a standardized hot-pluggable transceiving unit comprising a housing, a board and a chipset. The housing has specific standardized dimensions and is adapted to being inserted into a chassis of a hosting unit. The board and the chipset are in the housing. The board comprises at least two electro-mechanical components. The chipset also comprises at least two electro-mechanical components. Each electro-mechanical component of the chipset collaborates with a corresponding electro-mechanical component of the board for simultaneously providing a mechanical anchor and an electrical connection between the chipset and the board. The chipset further comprises a programmable processing component for processing a signal transmitted by the board via the electrical connection between the board and the chipset.

In a particular aspect, the transceiving unit receives a first signal comprising data in a first form, and the programmable processing component of the chipset comprises a coding module for encoding or decoding the data of the first signal having the first form into data having a second form.

BRIEF DESCRIPTION OF THE DRAWINGS

Embodiments of the disclosure will be described by way of example only with reference to the accompanying drawings, in which.

DETAILED DESCRIPTION

Figure 1:
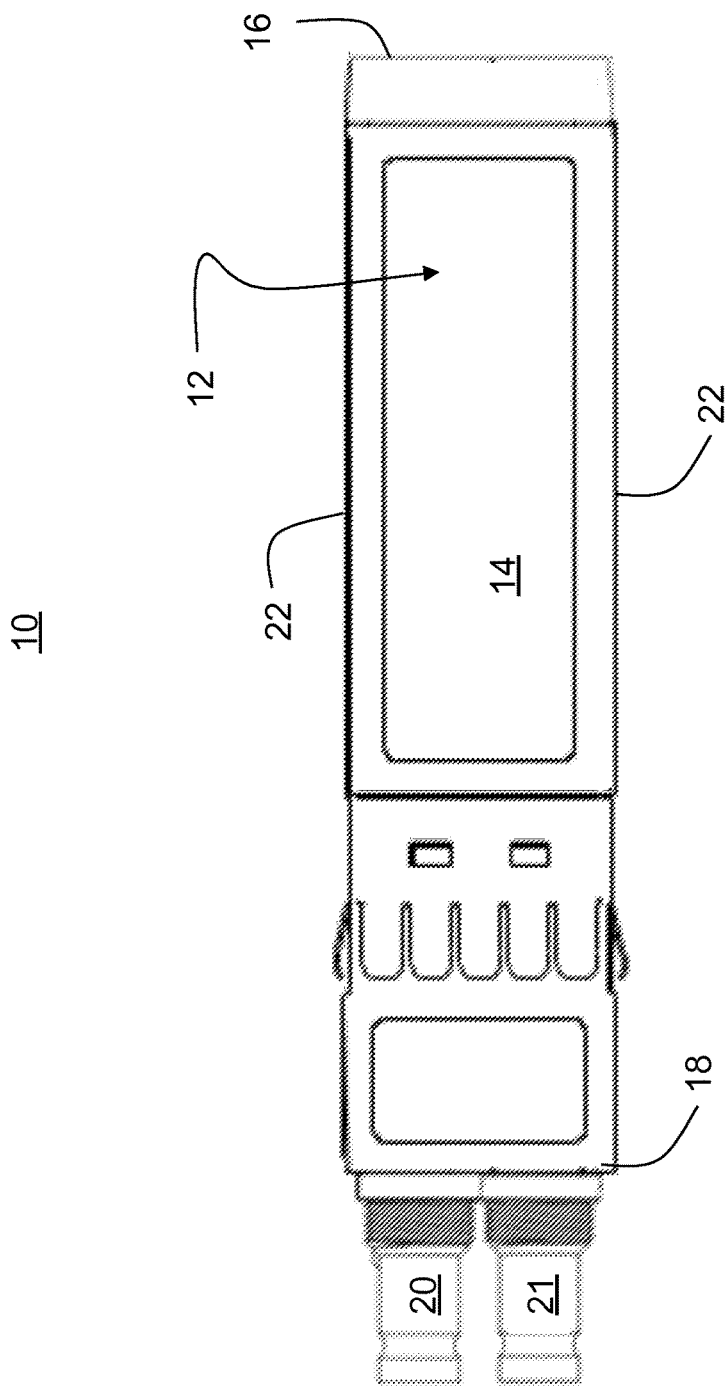
FIG. 1 is a top view of an SFP unit.
Figure 2:
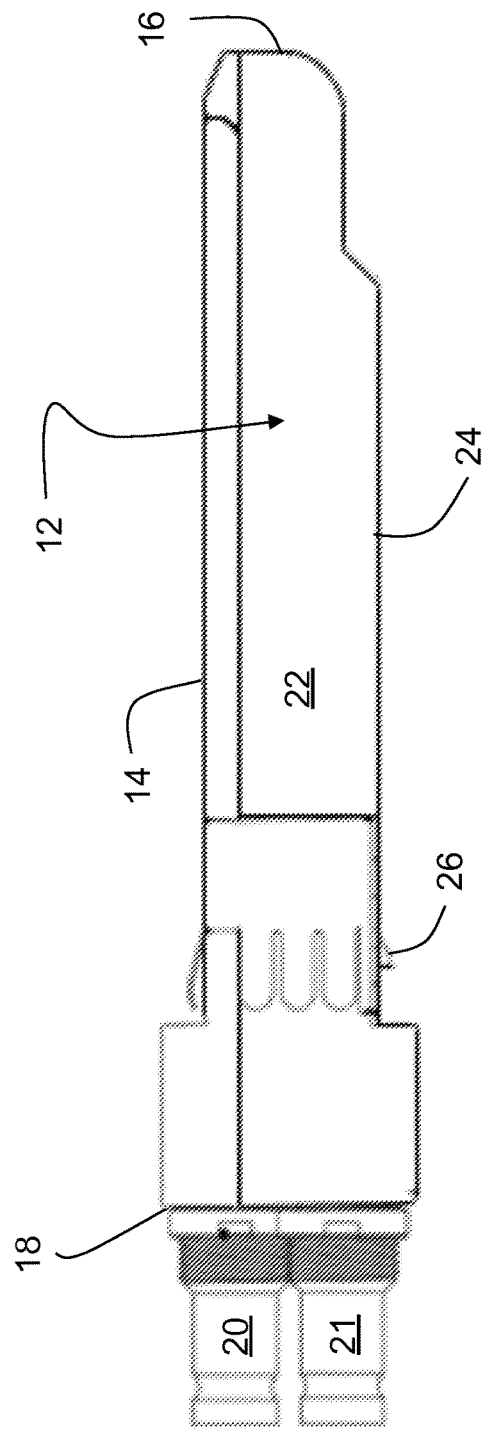
FIG. 2 is a side elevation view of the SFP unit of FIG. 1.
Figure 4:
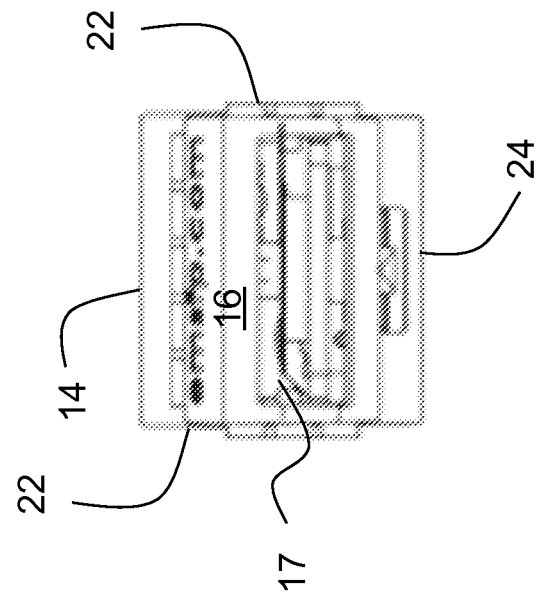
FIG. 4 is back elevation view of the SFP unit of FIG. 1.
Figure 3:
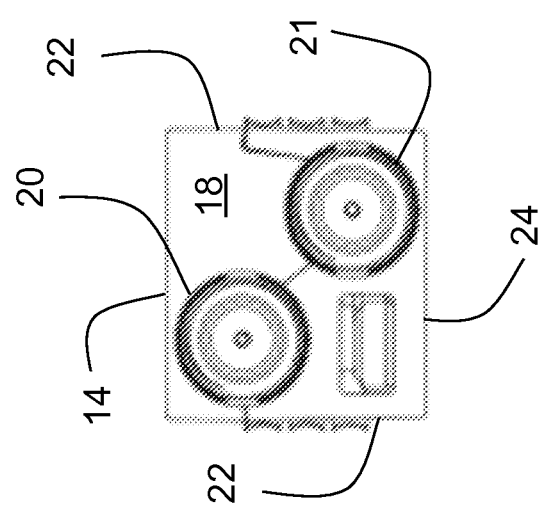
FIG. 3 is a front elevation view of the SFP unit of FIG. 1.
Figure 5:
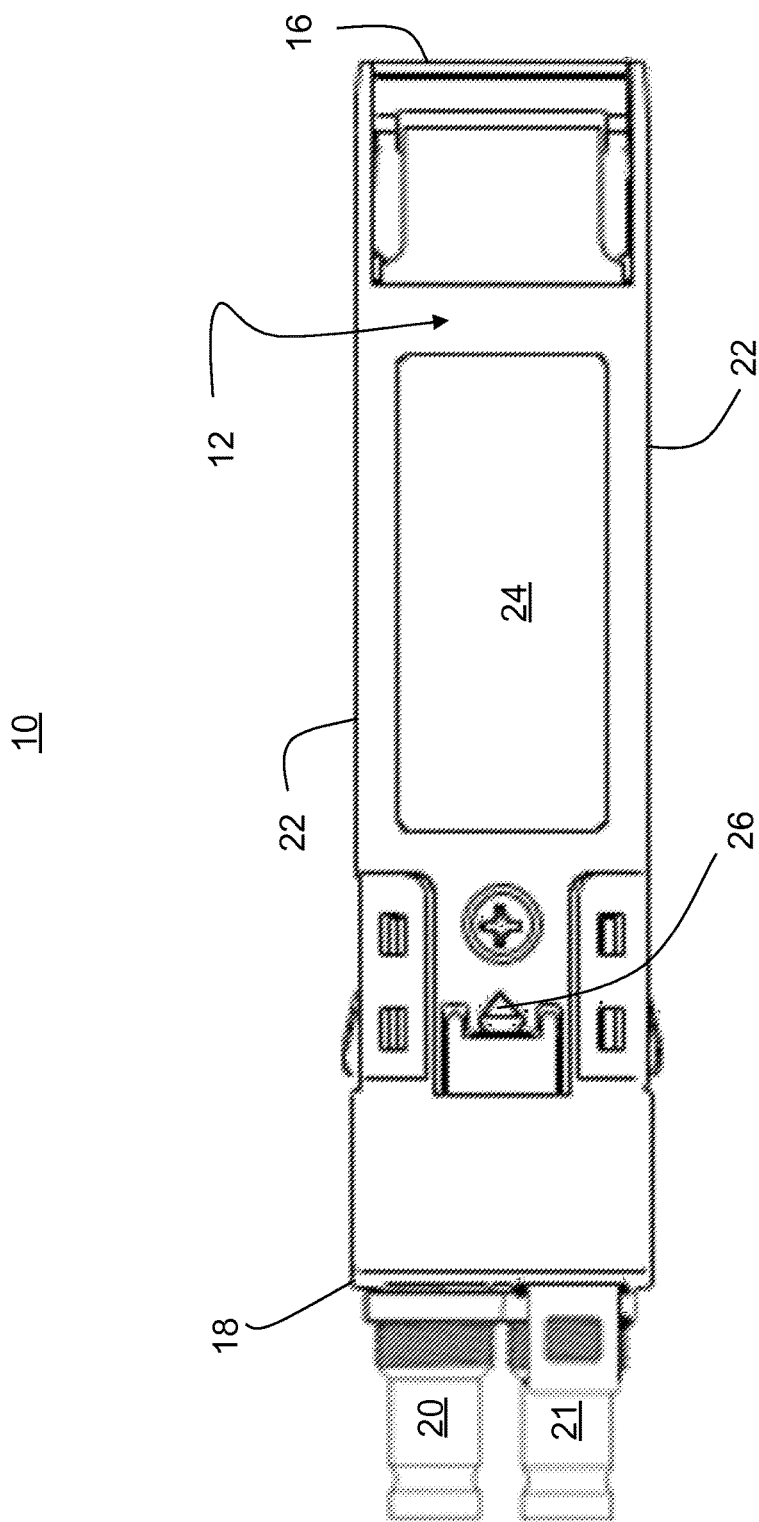
FIG. 5 is a bottom view of the SFP unit of FIG. 1.
Figure 6:
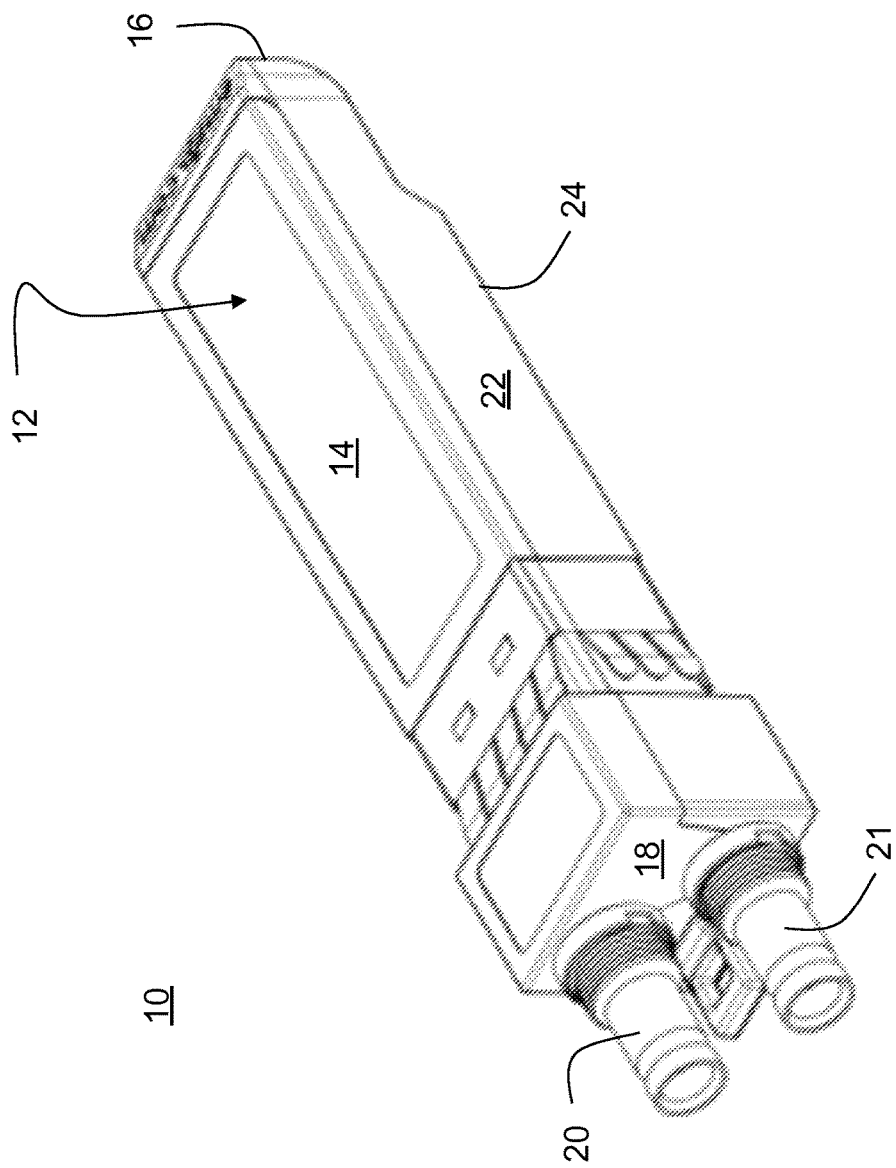
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. Conventional units merely provide connection capabilities between a hosting unit in which they are inserted and external apparatuses. The standardized hot-pluggable transceiving unit disclosed herein provides a chipset mechanically anchored and electrically connected to a board, the board and chipset being inside a housing of the transceiving unit. The chipset comprises a programmable processing component for processing a signal received from the board.

The following terminology is used throughout the present disclosure:

SFP: Small Form-factor Pluggable, this term refers to units that are insertable into a chassis of a hosting unit; in the present disclosure, an SFP unit complies with an industry standard specification.

ADC: Analog to Digital Converter or Conversion of an electrical or optical signal.

DAC: Digital to Analog Converter or Conversion of an electrical or optical signal.

Serializer: Module converting data from a parallel format to a serial format.

Deserializer: Module converting data from a serial format to a parallel format.

Connector: A device component for physically joining circuits carrying electrical, optical, radio-frequency, or like signals.

Video signal: Analog or digital signal usable for display purposes, either directly on a monitor, or through multicast or broadcast.

NTSC: National Television System Committee specification for analog television broadcast used in North America and elsewhere.

PAL: Phase Alternating Line specification for analog television broadcast used in Western Europe and elsewhere.

SECAM: Séquentiel couleur á mémoire, French for "Sequential Color with Memory", specification for analog television broadcast used in France, Eastern Europe and elsewhere.

RGB: Red Green Blue color model for video signals, used for example in computer displays; this includes both RGBS, in which horizontal and vertical synchronization are carried on a single (S) wire, and RGBHV, in which horizontal synchronization is carried on a (H) wire and vertical synchronization is carried on a (V) wire.

SDI: Serial Digital Interface, a family of digital video interfaces using one or more coaxial cables with Bayonet Neill-Concelman (BNC) connectors.

SDTV: Standard-definition television uses a resolution that is not considered to be either high-definition television (HDTV) or enhanced-definition television (EDTV). The two common SDTV signal types are 576i, with 576 interlaced lines of resolution, derived from the European-developed PAL and SECAM systems.

EDTV: Enhanced-definition television defines formats (e.g. 480p) that deliver a picture superior to that of SDTV, but not as detailed as HDTV.

HDTV: High-definition television defines formats (e.g. 720p, 1080i, and 1080p) that provide a resolution that is substantially higher than that of SDTV and EDTV.

$YP_BP_R$: Color space encoding in which Y represents a brightness level, $P_B$ carries a difference between blue and the brightness level, and $P_R$ carries a difference between red and the brightness level.

JPEG: An image compression standard defining encoding and decoding schemes applied to digital images and digital video signals such as digital television signals.

JPEG 2000: An image compression standard (also known as J2K) that is a successor of the JPEG compression standard. The JPEG 2000 standard uses wavelet-based image compression and stores metadata as Extensible Markup Language (XML) instead of Exchangeable image file format (Exif) data.

SMPTE: A family of digital video transmission standards published by the Society of Motion Picture and Television Engineers (SMPTE).

H264: A video compression format also known as MPEG4 AVC (Advanced Video Coding).

MPEG2: A standard for generic coding and compression of moving pictures and associated audio information.

MPEG4: A standard for a group of audio and video coding and compression formats.

HEVC: High Efficiency Video Coding, a video compression standard (also known as H265) successor to the H.264/MPEG-4 AVC standard.

Coding module: A hardware component or computer program capable of encoding or decoding a digital data stream or a signal. A coding module may encode a communication protocol for transmission, storage or encryption, or decode it for playback or editing.

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4x10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP Unit may correspond to SFP, SFP+, XFP, Xenpak, QSFP, QSFP+, CFP, CPAK, or any other known standards related to Small Form-factor Pluggable units.

In the present description, the term "video signal" may designate signals compliant with various standards and specifications, including but not limited to a National Television System Committee (NTSC) signal, a Phase Alternating Line (PAL) signal, a Sequential Color with Memory (SECAM) signal, an analog signal of the Red Green Blue (RGB) format, a standard definition television (SDTV) format, an enhanced definition television (EDTV) format, a high definition television (HDTV) format, a full high definition (full HD) format, an SMPTE format, etc.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 may have functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 may comprise a rear interface 17, for instance an electrical or an optical interface. In an example, the back panel comprises the rear interface 17 (also named a host connector) suitable to connect the SFP unit 10 to a backplane of a chassis (not shown for clarity purposes), as known to those skilled in the art.

The SFP unit 10 further comprises a front panel 18 affixed to the housing 12. The front panel 18 may comprise one or more connectors, for example a connector 20 of a co-axial cable type, adapted to send and/or receive an analog or digital video signal and a connector 21, also of the co-axial cable type, adapted to send and/or receive a serial data signal. The SFP unit 10 may further comprise an engagement mechanism, such as for example a latch 26 as shown in a resting position on the bottom 24 in FIG. 2, for maintaining the SFP unit 10 in place within a chassis.

Examples of connectors in the context of the present disclosure comprise all types of co-axial cable connectors, all types of optic fiber connectors, a Separate Video (S-Video) connector, a Composite Video, Blanking and Sync (CVBS) connector, a Radio Corporation of America (RCA) connector, a BNC connector, a DIN (specified by the Deutsches Institut für Normung) 1.0/2.3 connector, a HD-BNC connector, a Mini-BNC connector, a Video In Video Out (VIVO) connector, a $YP_BP_R$ connector, a mini Video Graphics Array (VGA) connector, a TV Aerial Plug connector, a mini-DIN connector, a Universal Serial Bus (USB) connector, a High-Definition Multimedia Interface (HDMI) connector, and a SDI connector, wherein SDI connectors include variants known as SD-SDI, HD-SDI, ED-SDI, 3G-SDI, 6G-SDI, 12G-SDI and the like. Some of these connector types are suitable for transmission of analog video signals, digital video signals or serial data signals, or a combination thereof, as is well-known to those of ordinary skill in the art. Consequently, in an embodiment, the connector 20 and the connector 21 may be of the same type. Furthermore, the connectors are not limited to receiving and/or transmitting video signals, but may support other types of signals, such as for example telecommunication signals.

Figure 7A:
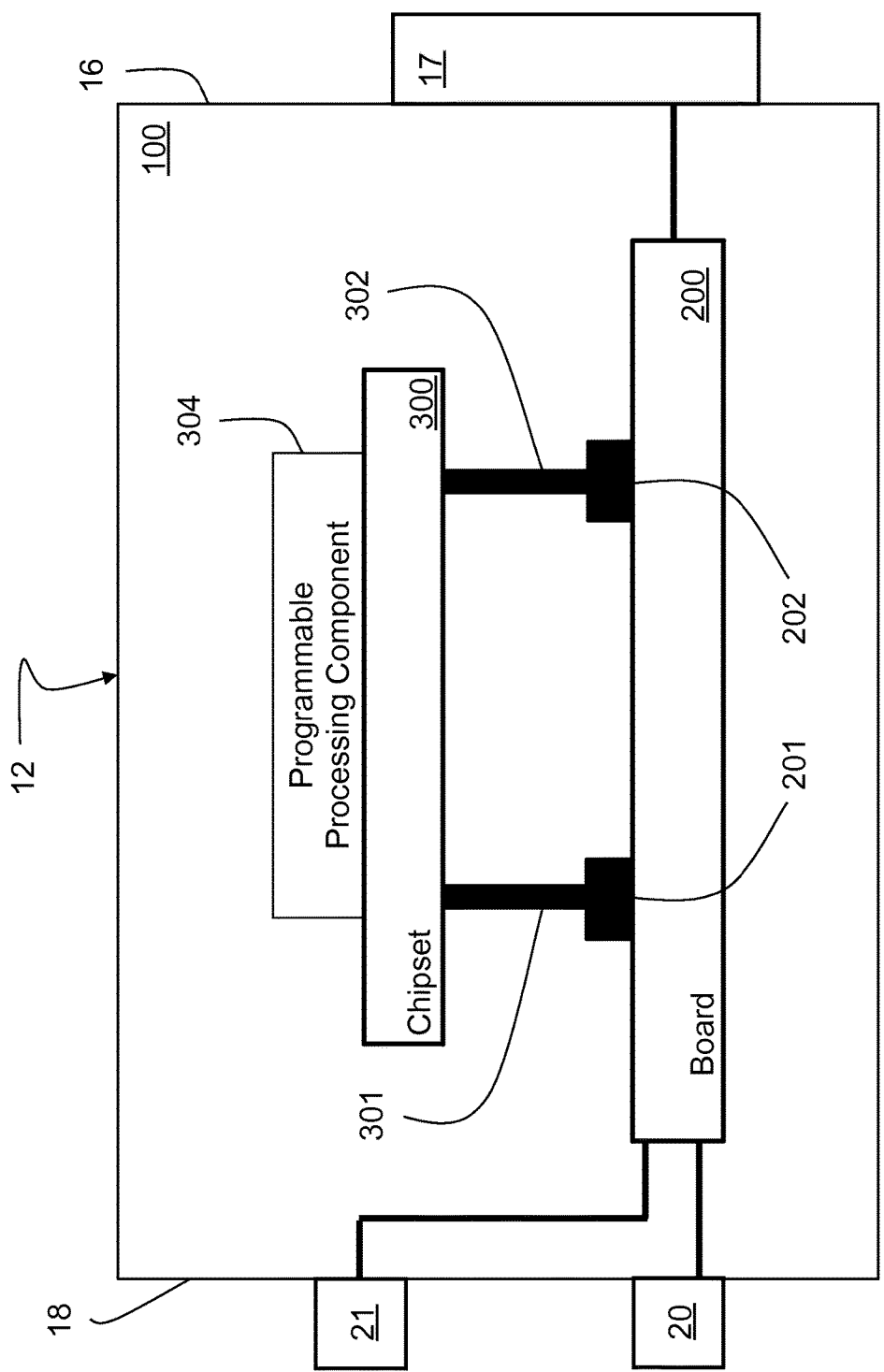
FIGS. 7A to 7I represent simplified exemplary block diagrams of the SFP unit of FIG. 1 comprising a board and a chipset mechanically anchored and electrically connected to the board, according to various embodiments.

Referring now to FIG. 7A, a schematic block diagram of an SFP unit 100 having a board 200 and at chipset 300 is illustrated. The SFP unit 100 corresponds to the SFP unit 10 represented in FIGS. 1-6, and has been adapted to support the chipset 300. A traditional SFP unit only comprises the board 200, which comprises electronic components for implementing functionalities of the traditional SFP unit. FIG. 7A corresponds to the side elevation view of the SFP unit 10 represented in FIG. 2. The board 200 and the chipset 300 are internal to its housing 12. The housing 12 has specific standardized dimensions and is adapted to being inserted into a chassis of a hosting unit (not represented in the Figures).

The board 200 comprises at least two electro-mechanical components. For illustration purposes, in FIG. 7A, the board 200 is represented with two electro-mechanical components 201 and 202. The chipset 300 also comprises at least two electro-mechanical components. For illustration purposes, in FIG. 7A, the chipset 300 is also represented with two electro-mechanical components 301 and 302. Each electro-mechanical component of the chipset 300 collaborates with a corresponding electro-mechanical component of the board 200 for simultaneously providing a mechanical anchor and an electrical connection between the chipset 300 and the board 200. For example, as illustrated in FIG. 7A, the electro-mechanical component 301 collaborates with the electro-mechanical component 201 and the electro-mechanical component 302 collaborates with the electro-mechanical component 202.

The chipset 300 is removably attached to the board 200 via the mechanical anchor provided by the pairs of corresponding and collaborating electro-mechanical components (respectively the pair 301/201, and the pair 302/202). A particular localization and orientation of the electro-mechanical components on the board 200 and the chipset 300 providing a stable and resilient attachment of the chipset 300 to the board 200 can be determined experimentally. This particular localization and orientation depends on a particular geometry of the chipset 300 and board 200.

The electrical connection provided by the pairs of corresponding and collaborating electro-mechanical components allows an exchange of electrical signals comprising data between the board 200 and the chipset 300.

Although two pairs of corresponding and collaborating electro-mechanical components are represented in FIG. 7A, two or more pairs may be used. Furthermore, the board 200 and the chipset 300 may comprise a different number of electro-mechanical components. For example, the board 200 comprises more electro-mechanical components than the chipset 300, and the localization and orientation of the electro-mechanical components on the board 200 are adapted for receiving various types of chipsets 300. A particular subset of the electro-mechanical components on the board 200 is adapted for receiving a particular type of chipset 300.

The respective dimensions and shapes of the board 200, the chipset 300, and the electro-mechanical components (201, 202, 301 and 302) illustrated in FIG. 7A have been chosen to facilitate the understanding of FIG. 7A, and are not necessarily representative of a real implementation of a board/chipset configuration in a SFP unit.

In a particular embodiment, the electro-mechanical components (201 and 202) of the board 200 consist in female electrical connectors, and the electro-mechanical components (301 and 302) of the chipset 300 consist in corresponding male electrical connectors. In another particular embodiment, the electro-mechanical components (201 and 202) of the board 200 consist in male electrical connectors, and the electro-mechanical components (301 and 302) of the chipset 300 consist in corresponding female electrical connectors. Such male and female electrical connectors are well known in the art, and are also respectively referred to as a plug (male) and a receptacle (female).

In a particular aspect, the chipset 300 is superposed to the board 200 or to electrical components on the board, for implementing a mezzanine configuration. An horizontal surface of the chipset 300 may only partially cover an horizontal surface of the board 200. Furthermore, the orientation, shape and dimensions of the chipset 300 are adapted to the board 300, and to the specific standardized dimensions of the housing 12.

Although a single chipset 300 is represented in FIG. 7A, the SFP unit 100 may comprise a plurality of chipsets 300. The electro-mechanical components of each particular chipset 300 collaborate with corresponding electro-mechanical components of the board 200, for simultaneously providing a mechanical anchor and an electrical connection between the particular chipset 300 and the board 200. For example, the plurality of chipsets 300 is superposed to the board 200, and each particular chipset 300 is localized above a particular area of the board 200, electrical components on the board, or over another chipset already electrically connected and mechanically anchored to the board 200 by means of electro-mechanical components.

The chipset 300 further comprises a programmable processing component 304 for processing a signal transmitted by the board 200 to the chipset 300. The signal is transmitted via the electrical connection between the board 200 and the chipset 300. More specifically, the signal is transmitted by one of the pairs of corresponding electro-mechanical components (e.g. the pair 201 and 301, or the pair 202 and 302). The transmitted signal may be a digital electrical signal or an analog electrical signal. The transmitted signal is processed by the programmable processing component 304. The programmable processing component 304 further generates a processed signal, which is transmitted to the board 200 via the electrical connection between the chipset 300 and the board 200. More specifically, the signal is transmitted by one of the pairs of corresponding electro-mechanical components (e.g. the pair 301 and 201, or the pair 302 and 202). For example, in the case of a digital electrical signal, the processing component 304 extracts data from the signal transmitted by the board 200, processes the extracted data to generate processed data, and the processed signal transmitted to the board 200 comprises the processed data. Each pair of corresponding electro-mechanical components (e.g. the pair 201 and 301) may be capable of only transmitting a signal from the board 200 to the chipset 300, of only transmitting a signal from the chipset 300 to the board 200, or of transmitting a signal in both directions.

In a particular aspect, the board 200 provides electrical power supply to the chipset 200 via at least one of the pairs of corresponding electro-mechanical components (e.g. 201 and 301). For instance, the provided electrical power supply is used for powering the programmable processing component 304 of the chipset 300.

The SFP unit 100 comprises a connector for receiving a signal. As will be detailed in the following illustrative embodiments, the signal may be received by a connector 20 or 21 on the front panel 18 of the SFP unit 100, or by a connector 17 on the back panel 16 of the SFP unit 100. The connector 17 is a rear interface for connecting the SFP unit 100 to its hosting unit. Although represented with two connectors on the front panel 18, the SFP unit 100 may comprise a single connector (either 20 or 21) on its front panel 18. The received signal is processed by components of the board 200 and/or components of the chipset 300 (e.g. programmable processing component 304) to generate a new signal that is outputted by one of the connectors of the SFP unit 100. The new signal may be outputted by the same connector that received the original signal, or by another connector. Although not represented in FIG. 7A, the board 200 may comprise at least one signal processing unit, for example to pre-process a signal received by the SFP unit 100, or to post-process a signal before it is outputted by the SFP unit 100.

In a first aspect, a signal is received by a connector (e.g. 20, 21 or 17) of the SFP unit 100. The signal is transferred from the connector (e.g. 20, 21 or 17) to the board 200, and further transferred from the board 200 to the chipset 300. The signal is processed by the programmable processing component 304 of the chipset 300. For example, the received signal is an electrical signal which does not need to be adapted by a signal processing unit of the board 200 before transfer to the chipset 300 for processing by the programmable processing component 304.

In a second aspect, a first signal is received by a connector (e.g. 20, 21 or 17) of the SFP unit 100. The first signal is transferred from the connector (e.g. 20, 21 or 17) to the board 200. The first signal is processed by a signal processing unit (not represented in FIG. 7A) of the board 200 into a second signal. The second signal is further transferred from the board 200 to the chipset 300. The second signal is processed by the programmable processing component 304 of the chipset 300. For example, the received signal is an analog electrical signal (received by an analog electrical connector of the SFP unit 100), which is transformed into a digital electrical signal (the second signal) by the signal processing unit of the board 200. In another example, the received signal is an optical signal (received by an optical connector of the SFP unit 100), which is transformed into an electrical signal (the second signal) by the signal processing unit of the board 200.

In a third aspect, the programmable processing component 304 of the chipset 300 generates a signal. The generated signal results from the processing by the programmable processing component 304 of a signal received from the board 200 (as previously described in the first and second aspects). The signal generated by the programmable processing component 304 is transferred from the chipset 300 to the board 200, and further transferred from the board 200 to a connector (e.g. 20, 21 or 17) of the SFP unit 100 for being outputted by the connector. For example, the signal generated by the programmable processing component 304 is an electrical signal which does not need to be adapted by a signal processing unit of the board 200 before being outputted by an electrical connector of the SFP unit 100.

In a fourth aspect, the programmable processing component 304 of the chipset 300 generates a first signal. The generated first signal results from the processing by the programmable processing component 304 of a signal received from the board 200 (as previously described in the first and second aspects). The first signal generated by the programmable processing component 304 is transferred from the chipset 300 to the board 200. The first signal is processed by a signal processing unit (not represented in FIG. 7A) of the board 200 into a second signal. The second signal is transferred from the board 200 to a connector (e.g. 20, 21 or 17) of the SFP unit 100 for being outputted by the connector. For example, the first signal is a digital electrical signal which is transformed into an analog electrical signal (the second signal) by the signal processing unit of the board 200, for being outputted by an analog electrical connector of the SFP unit 100. In another example, the first signal is an electrical signal which is transformed into an optical signal (the second signal) by the signal processing unit of the board 200, for being outputted by an optical connector of the SFP unit 100.

As illustrated in FIG. 7A, the chipset 300 is not directly connected to the connectors 20, 21 or 17 of the SFP unit 100. Thus, it cannot directly receive a signal from an external device connected to the SFP unit 100, or directly transmit a signal to an external device connected to the SFP unit 100. The board 200 is used as an intermediate by the chipset 300 for exchanging signals with the external devices connected to the SFP unit 100.

Figure 7B:
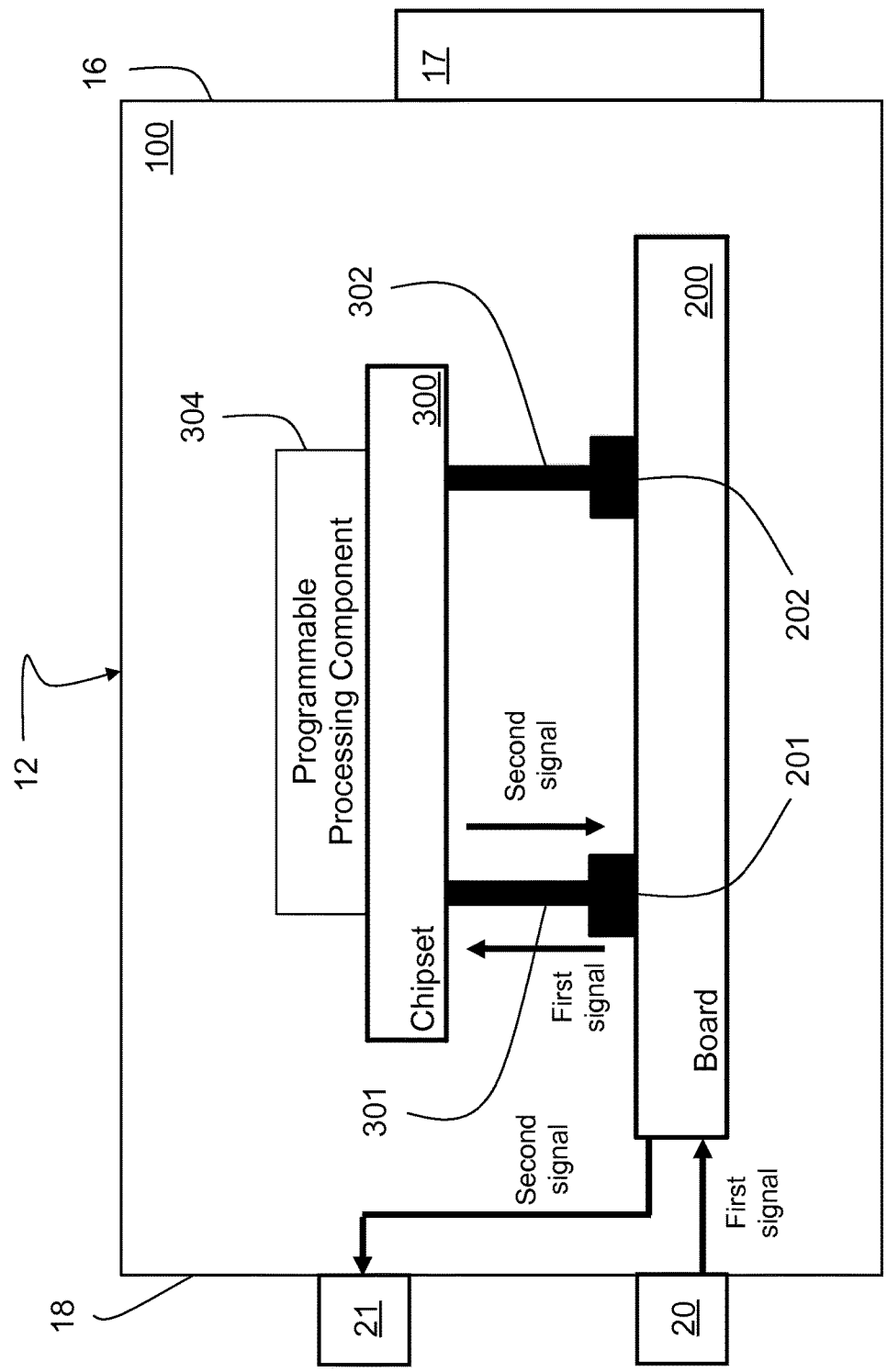

In a first illustrative embodiment represented in FIG. 7B, the connector 20 on the front panel 18 receives a first signal, and transfers the first signal to the board 200. The first signal is further transferred from the board 200 to the chipset 300 by the pair of electro-mechanical components 201/301. The first signal is processed by the programmable processing component 304 of the chipset 300 to generate a second signal. The second signal is transferred from the chipset 300 to the board 200 by the pair of electro-mechanical components 301/201. The second signal is further transferred from the board 200 to the connector 21 on the front panel 18, where it is outputted.

Figure 7C:
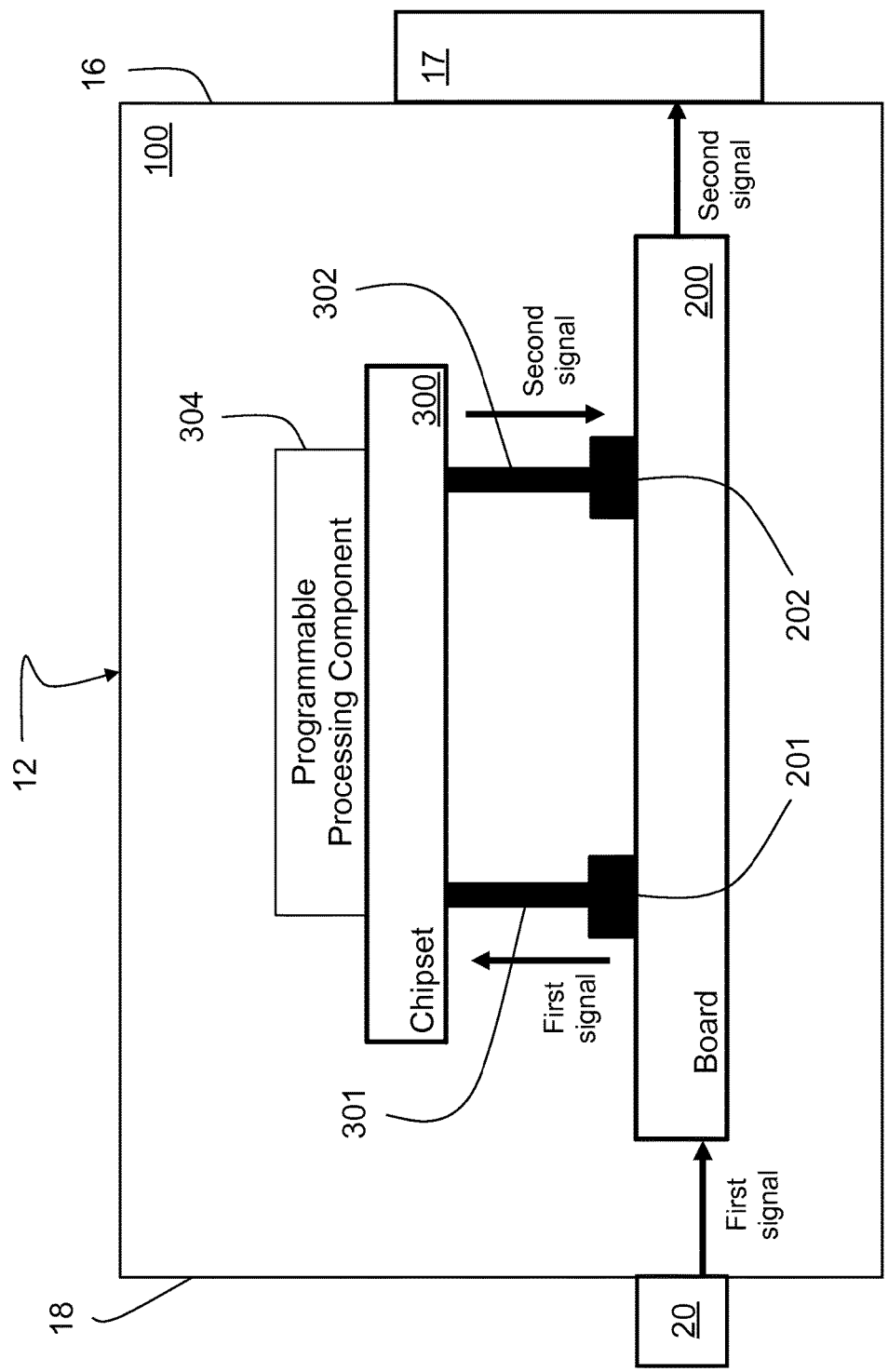

In another illustrative embodiment represented in FIG. 7C, the connector 20 on the front panel 18 receives a first signal, and transfers the first signal to the board 200. The first signal is further transferred from the board 200 to the chipset 300 by the pair of electro-mechanical components 201/301. The first signal is processed by the programmable processing component 304 of the chipset 300 to generate the second signal. The second signal is transferred from the chipset 300 to the board 200 by the pair of electro-mechanical components 302/202. The second signal is further transferred from the board 200 to the connector 17 (rear interface) on the back panel 16, where it is outputted.

Figure 7D:
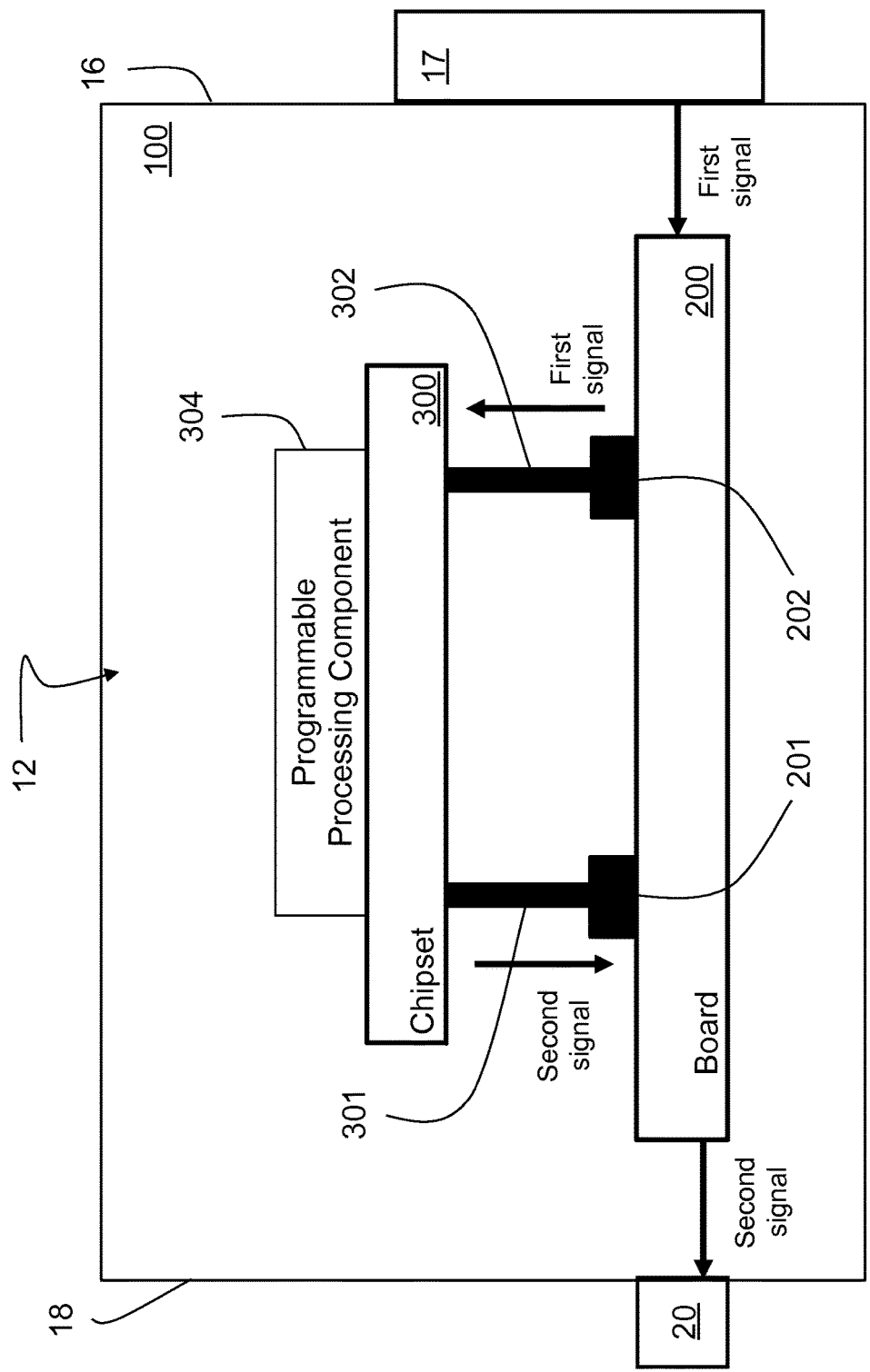

In still another illustrative embodiment represented in FIG. 7D, the connector 17 (rear interface) on the back panel 16 receives a first signal, and transfers the first signal to the board 200. The first signal is further transferred from the board 200 to the chipset 300 by the pair of electro-mechanical components 202/302. The first signal is processed by the programmable processing component 304 of the chipset 300 to generate the second signal. The second signal is transferred from the chipset 300 to the board 200 by the pair of electro-mechanical components 301/201. The second signal is further transferred from the board 200 to the connector 20 on the front panel 18, where it is outputted.

Figure 7E:
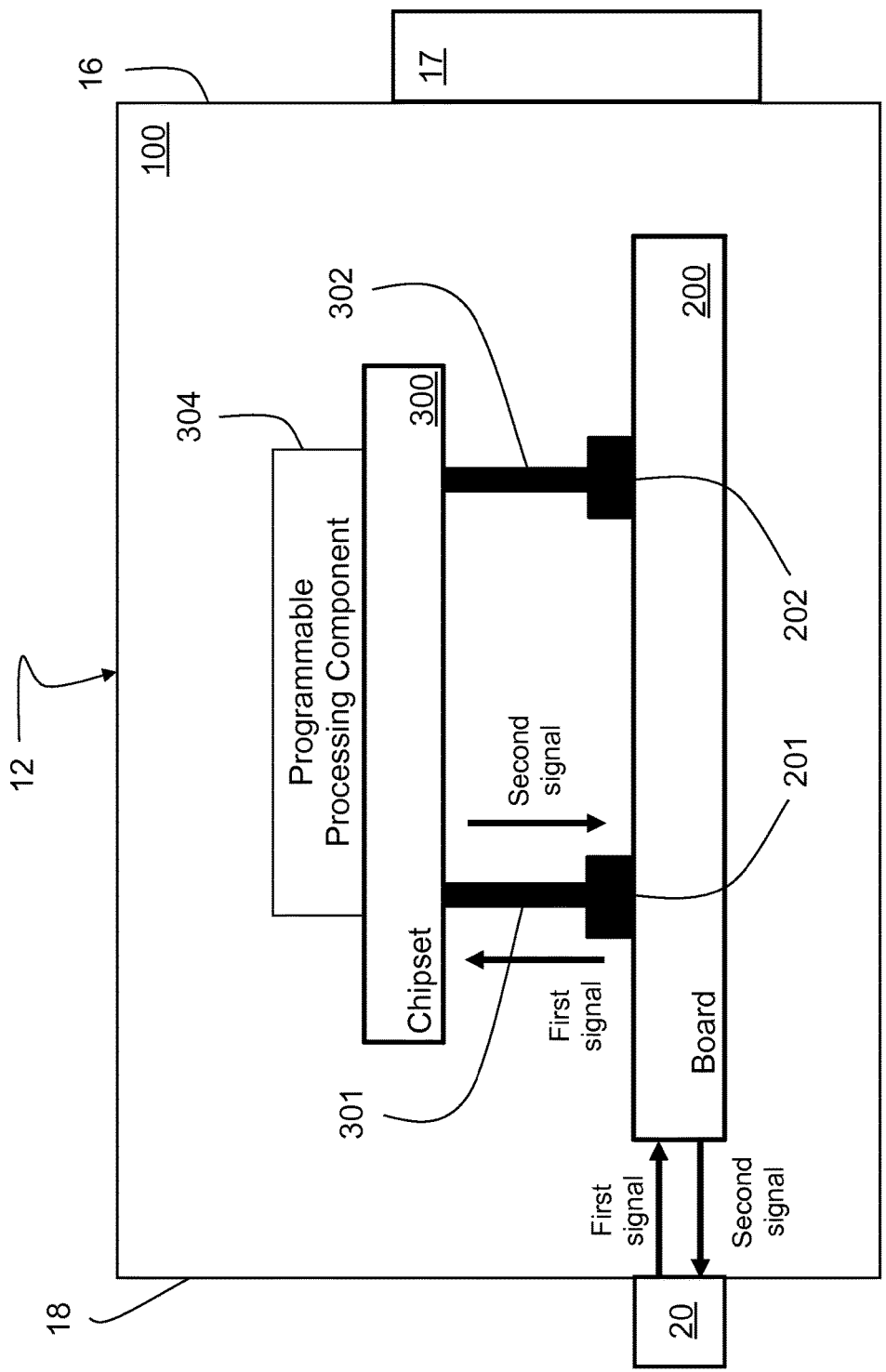

In yet another illustrative embodiment represented in FIG. 7E, the connector 20 on the front panel 18 receives a first signal, and transfers the first signal to the board 200. The first signal is further transferred from the board 200 to the chipset 300 by the pair of electro-mechanical components 201/301. The first signal is processed by the programmable processing component 304 of the chipset 300 to generate a second signal. The second signal is transferred from the chipset 300 to the board 200 by the pair of electro-mechanical components 301/201. The second signal is further transferred from the board 200 to the connector 20 on the front panel 18, where it is outputted. The connector 20 is a transceiver connector.

Figure 7F:
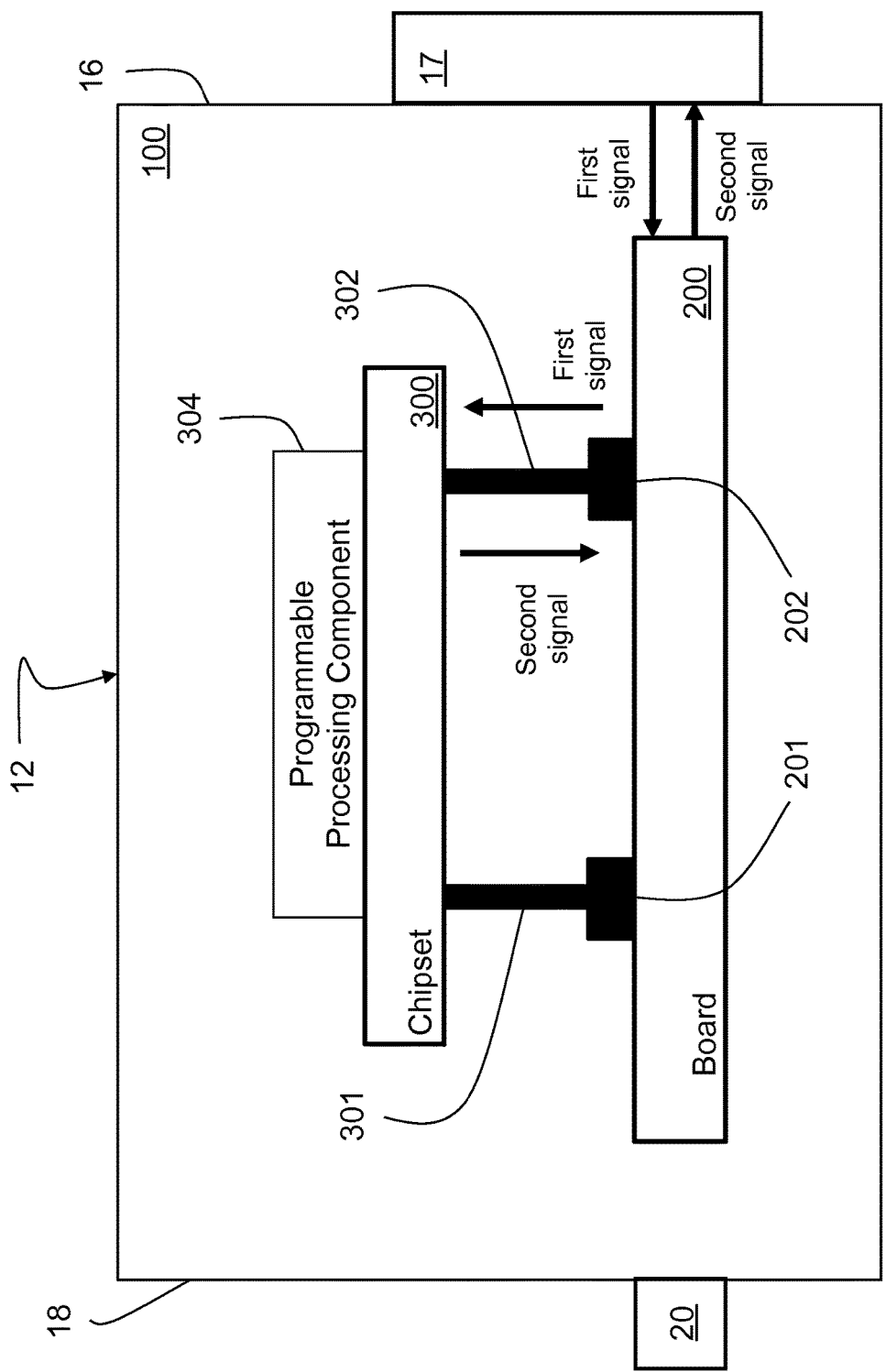

In another illustrative embodiment represented in FIG. 7F, the connector 17 (rear interface) on the back panel 16 receives a first signal, and transfers the first signal to the board 200. The first signal is further transferred from the board 200 to the chipset 300 by the pair of electro-mechanical components 202/302. The first signal is processed by the programmable processing component 304 of the chipset 300 to generate a second signal. The second signal is transferred from the chipset 300 to the board 200 by the pair of electro-mechanical components 302/202. The second signal is further transferred from the board 200 to the connector 17 (rear interface) on the back panel 16, where it is outputted. The connector 17 is a transceiver connector.

Figure 7G:
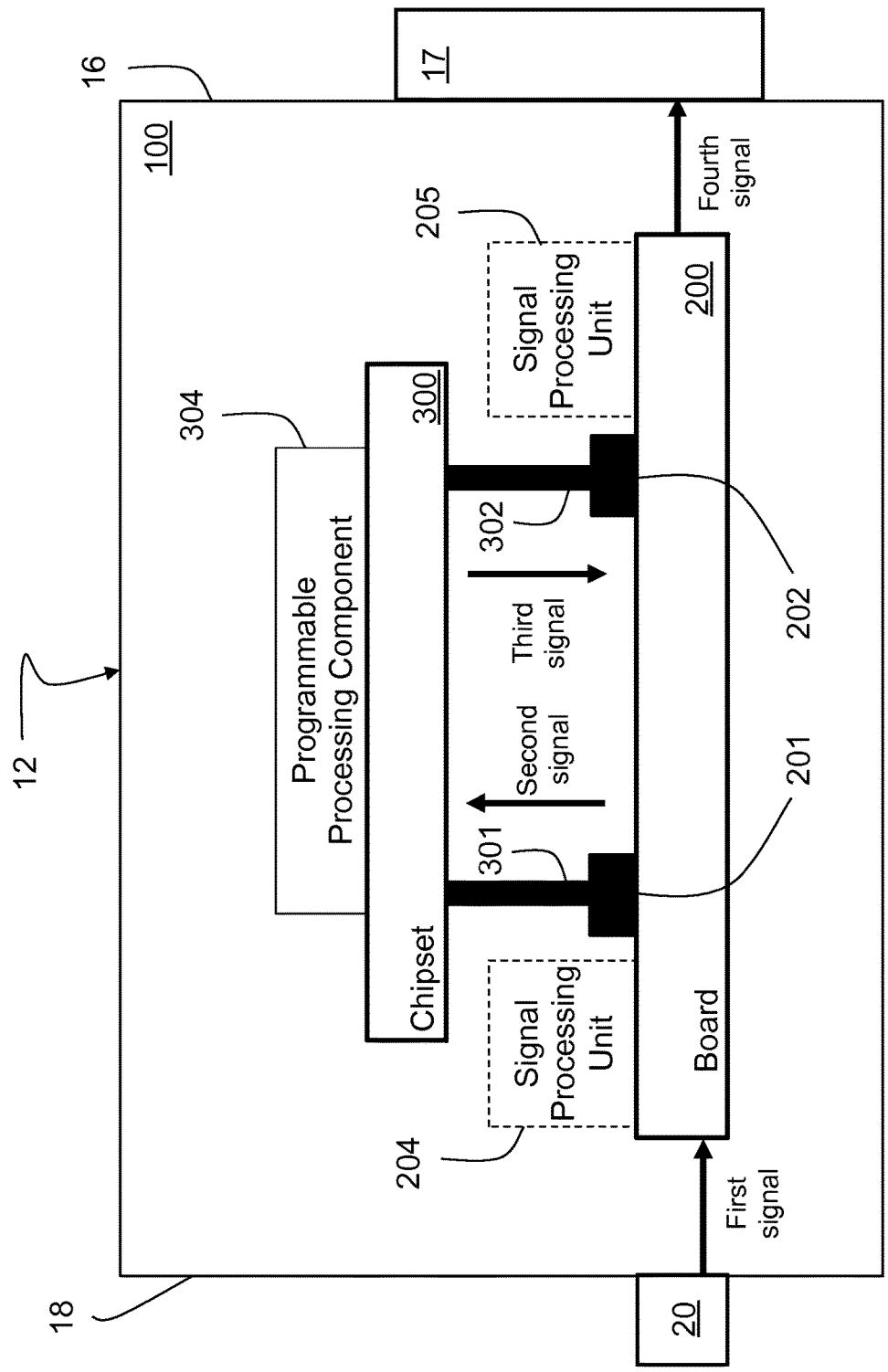

In still another illustrative embodiment represented in FIG. 7G, the board 200 comprises at least one signal processing unit (e.g. 204 and/or 205). For instance, the signal processing unit 204 processes a first signal received by the connector 20 on the front panel 18 into a second signal. The second signal is transferred from the board 200 to the chipset 300. The second signal is processed by the programmable processing component 304 of the chipset 300. Alternatively or complementarily, the signal processing unit 205 processes a third signal transferred from the chipset 300 to the board 200 into a fourth signal. The third signal is generated by the programmable processing component 304 of the chipset 300 (e.g. through the processing of the second signal by the programmable processing component 304). The fourth signal is outputted by the connector 17 on the back panel 16.

FIG. 7G corresponds to the illustrative embodiment represented in FIG. 7C, with the addition of one or more signal processing units (e.g. 204 and/or 205) on the board 200. However, in the illustrative embodiments represented in FIGS. 7B, 7D, 7E, and 7F, the board 200 may also comprise a signal processing unit for processing a signal received by a connector of the SFP unit 100, before its transfer from the board 200 to the chipset 300, for being further processed by the programmable processing component 304. Alternatively or complementarily, the board 200 may also comprise a signal processing unit for processing a signal generated by the programmable processing component 304 and transferred from the chipset 300 to the board 200, before being further outputted by a connector of the SFP unit 100. Furthermore, more than one signal processing unit 204 of the board 200 may operate in sequence or in parallel on a signal received by the SFP unit 100, prior to transferring the processed received signal from the board 200 to the chipset 300. Similarly, more than one signal processing unit 205 of the board 200 may operate in sequence or in parallel on a signal transferred from the chipset 300 to the board 200, prior to outputting the processed transferred signal from the SFP unit 100.

Figure 7H:
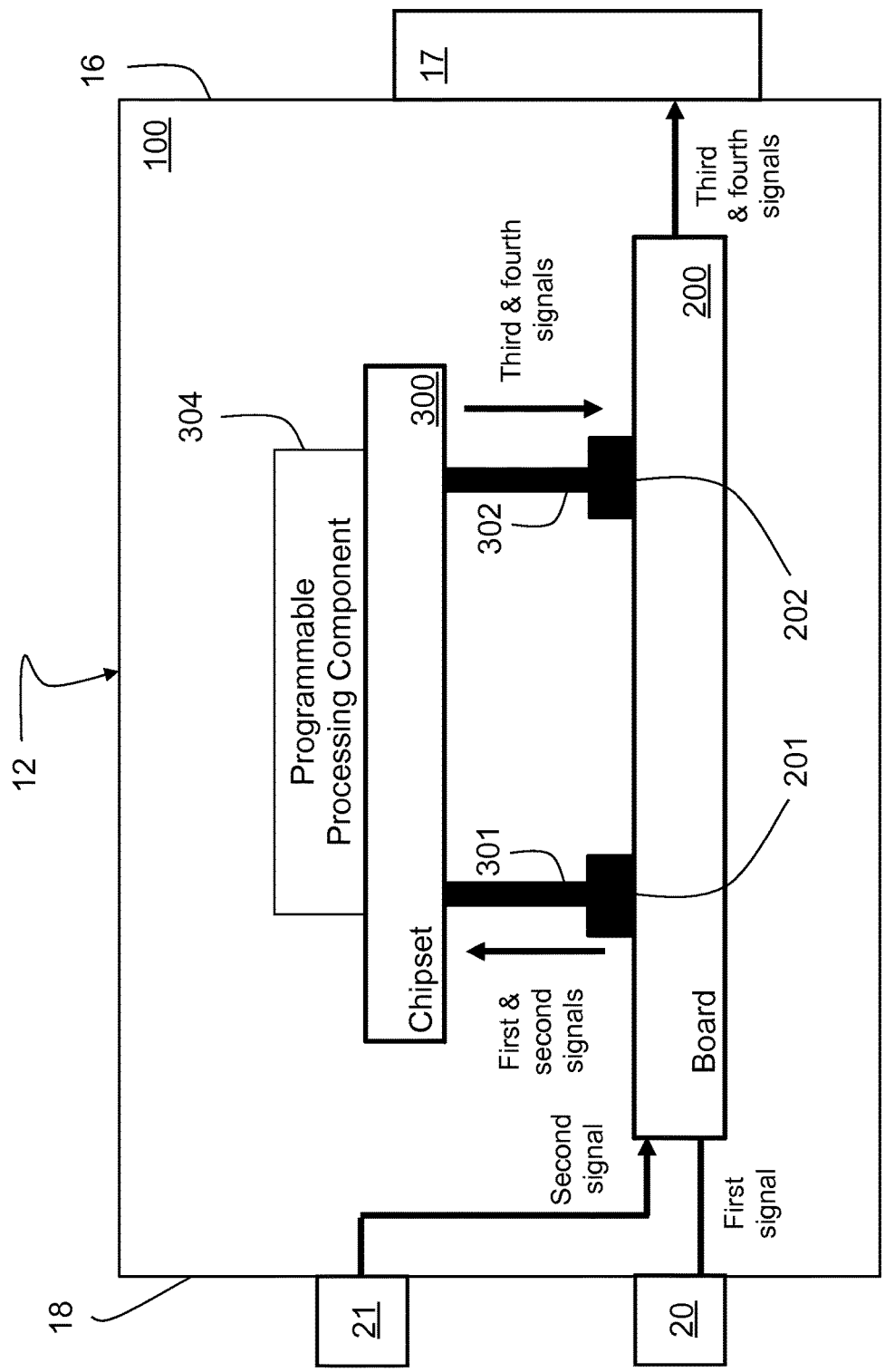

In yet another illustrative embodiment represented in FIG. 7H, the SFP unit 100 receives two input signals from two different connectors. The two input signals are transferred from the two different connectors to the board 200, and further transferred from the board 200 to the chipset 300. The two input signals are processed by the programmable processing component 304 of the chipset 300 to generate two corresponding output signals. The output signals are transferred from the chipset 300 to the board 200, and further outputted from the SFP unit 100 by the same or different connectors. For example, as illustrated in FIG. 7H, a first signal is received by the connector 20 on the front panel 18 and a second signal is received by the connector 21 on the front panel 18. The first and second signals are transferred to the chipset 300 via the board 200, and processed by the programmable processing component 304 of the chipset 300, to respectively generate corresponding third and fourth signals. The third and fourth signals are transferred from the chipset 300 to the board 200, and further outputted by the connector 17 on the back panel 16. As mentioned previously, at least one of the first, second, third and fourth signals may be processed by a signal processing unit (not represented in FIG. 7H) of the board 200, before transfer from the board 200 to the chipset 300 for the first and second signals, and after transfer from the chipset 300 to the board 200 for the third and fourth signals.

Figure 7I:
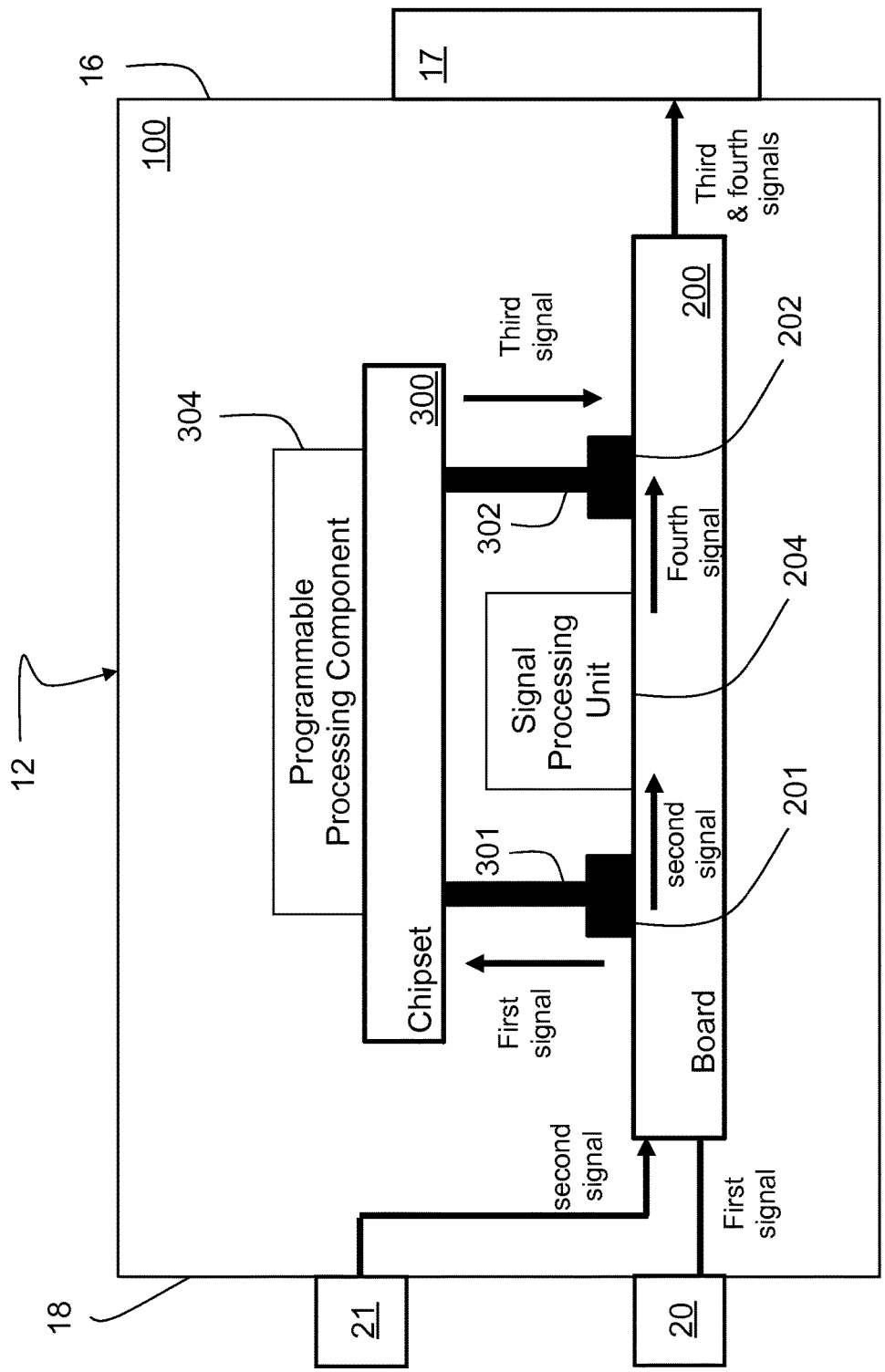

In another illustrative embodiment represented in FIG. 7I, the SFP unit 100 receives two input signals from two different connectors. The two input signals are transferred from the two different connectors to the board 200. One of the input signals is further transferred from the board 200 to the chipset 300, processed by the programmable processing component 304 of the chipset 300 to generate a corresponding output signal. The output signal is transferred from the chipset 300 to the board 200, and further outputted by a connector of the SFP unit 100. The other one of the input signals is further processed by at least one signal processing unit 204 of the board 200 to generate a corresponding output signal. The output signal is outputted by a connector of the SFP unit 100. For example, as illustrated in FIG. 7I, a first signal is received by the connector 20 on the front panel 18 and a second signal is received by the connector 21 on the front panel 18. The first and second signals are transferred to the board 200. The first signal is further transferred from the board 200 to the chipset 300, processed by the programmable processing component 304 of the chipset 300 to generate a corresponding third signal. The third signal is transferred from the chipset 300 to the board 200, and further outputted by the connector 17 on the back panel 16. The second signal is further processed by the signal processing unit 204 of the board 200 to generate a fourth signal. The fourth signal is outputted by the connector 17 on the back panel 16. This example illustrates embodiments where some of the signals received by the SFP unit 100 are uniquely processed by components of the board 200, while other signals received by the SFP unit 100 are processed by components of the chipset 300 (and optionally also components of the board 200).

In a particular aspect, the programmable processing component 304 of the chipset 300 is implemented by at least one Programmable Logic Device (PLD). A PLDs is well known in the art, and consists of an electronic component used to build reconfigurable digital circuits. The PLD has an undefined function at the time of manufacture, and it is programmed to provide a particular functionality to a device to which it is integrated. For instance, the PLD may comprise at least one Field-Programmable Gate Array (FPGA).

A PLD (e.g. an FPGA) is configurable by the customer or designer after manufacturing. A PLD may be used to implement any logical function. The ability for a user of the PLD to update functionality after shipping, and/or to partially reconfigure a portion of the design, and the low non-recurring engineering costs, offer advantages for many applications. A PLD may contain programmable logic components ("logic blocks"), and a hierarchy of reconfigurable interconnects that allow the blocks to be wired together in accordance with any user-specified configurations. In some embodiments, the logic blocks may be configured to perform complex combinational functions. In other embodiments, the logic blocks may be configured to perform simple logic gates, like AND and XOR. In some embodiments, logic blocks of a PLD may also include memory elements, which may be simple flip-flops or more complete blocks of memory.

A generic SFP unit 100 can be designed, comprising the board 200 for providing generic functionalities to the SFP unit 100. The generic functionalities include the interconnections with the connectors (e.g. 20, 21 and 17) of the SFP unit 100. Optionally, one or several signal processing units 204 can be integrated to the board 200, to add generic signal processing capabilities to the SFP unit. Examples of such processing units 204 include for example, and without limitations, the following functionalities: Analog to Digital Conversion (ADC), Digital to Analog Conversion (DAC), optical to electrical signal conversion, electrical to optical signal conversion, serializing, deserializing, signal re-clocking, signal reshaping or reconditioning, signals combination or separation, etc. The signal processing units 204 may be integrated to the board 200, as illustrated in FIG. 7G and/or as illustrated in FIG. 7I. The generic SFP unit 100 can be customized to provide one or several particular signal processing capabilities, by adding the chipset 300. The chipset 300 comprises one or several PLDs, which have been programmed to provide the one or several particular signal processing capabilities. The chipset 300 and its PLD(s) implementing the programmable processing component 304 may be produced as a die. A die is well known in the art, and consists of a small block of semiconducting material, on which a particular functional electronic circuit is fabricated. Using dies is an economic way of producing a large batch of particular functional electronic circuits.

Alternatively, the programmable processing component 304 of the chipset 300 is implemented with one or several processors, one or several memories, one or several Application-Specific Integrated Circuits (ASIC), a combination thereof, etc. The programmable processing component 304 may also include a combination of one or more PLDs, with at least one of a processor or an ASIC.

In another particular aspect, the programmable processing component 304 of the chipset 300 comprise a coding module for encoding or decoding data of a first signal having a first form into data having a second form. The first signal having the data in the first form is received by a connector (e.g. 20) of the SFP unit 100. A second signal having the data in the second form is outputted by the same connector (e.g. 20), or another connector (e.g. 21), of the SFP unit 100. In the rest of the disclosure, the coding module will also be referred to with the reference number 304.

In a first illustrative embodiment represented in FIG. 7B, the connector 20 on the front panel 18 receives the first signal having the data in the first form, and transfers the first signal to the board 200. The first signal is further transferred from the board 200 to the chipset 300 by the pair of electro-mechanical components 201/301. The coding module 304 of the chipset 300 encodes or decodes the data of the first signal having the first form into the data having the second form. A second signal comprising the data in the second form is generated by the coding module 304, and transferred from the chipset 300 to the board 200 by the pair of electro-mechanical components 301/201. The second signal is further transferred from the board 200 to the connector 21 on the front panel 18, where it is outputted.

In another illustrative embodiment represented in FIG. 7C, the connector 20 on the front panel 18 receives the first signal having the data in the first form, and transfers the first signal to the board 200. The first signal is further transferred from the board 200 to the chipset 300 by the pair of electro-mechanical components 201/301. The coding module 304 of the chipset 300 encodes or decodes the data of the first signal having the first form into the data having the second form. A second signal comprising the data in the second form is generated by the coding module 304, and transferred from the chipset 300 to the board 200 by the pair of electro-mechanical components 302/202. The second signal is further transferred from the board 200 to the connector 17 (rear interface) on the back panel 16, where it is outputted.

In still another illustrative embodiment represented in FIG. 7D, the connector 17 (rear interface) on the back panel 16 receives the first signal having the data in the first form, and transfers the first signal to the board 200. The first signal is further transferred from the board 200 to the chipset 300 by the pair of electro-mechanical components 202/302. The coding module 304 of the chipset 300 encodes or decodes the data of the first signal having the first form into the data having the second form. A second signal comprising the data in the second form is generated by the coding module 304, and transferred from the chipset 300 to the board 200 by the pair of electro-mechanical components 301/201. The second signal is further transferred from the board 200 to the connector 20 on the front panel 18, where it is outputted.

In yet another illustrative embodiment represented in FIG. 7E, the connector 20 on the front panel 18 receives the first signal having the data in the first form, and transfers the first signal to the board 200. The first signal is further transferred from the board 200 to the chipset 300 by the pair of electro-mechanical components 201/301. The coding module 304 of the chipset 300 encodes or decodes the data of the first signal having the first form into the data having the second form. A second signal comprising the data in the second form is generated by the coding module 304, and transferred from the chipset 300 to the board 200 by the pair of electro-mechanical components 301/201. The second signal is further transferred from the board 200 to the connector 20 on the front panel 18, where it is outputted. The connector 20 is a transceiver connector.

In another illustrative embodiment represented in FIG. 7F, the connector 17 (rear interface) on the back panel 16 receives the first signal having the data in the first form, and transfers the first signal to the board 200. The first signal is further transferred from the board 200 to the chipset 300 by the pair of electro-mechanical components 202/302. The coding module 304 of the chipset 300 encodes or decodes the data of the first signal having the first form into the data having the second form. A second signal comprising the data in the second form is generated by the coding module 304, and transferred from the chipset 300 to the board 200 by the pair of electro-mechanical components 302/202. The second signal is further transferred from the board 200 to the connector 17 (rear interface) on the back panel 16, where it is outputted. The connector 17 is a transceiver connector.

In an exemplary use case, the coding module 304 of a first SFP unit 100 represented in FIG. 7D encodes a signal received from a first hosting unit (not represented in FIG. 7D) via the rear interface 17. The resulting encoded signal is outputted via the front connector 20 to an electrical or optical cable (not represented in FIG. 7D). The cable transmits the encoded signal to a second SFP unit 100 represented in FIG. 7C. The coding module 304 of the second SFP unit 100 represented in FIG. 7C decodes the encoded signal received via the front connector 20. The resulting decoded signal is outputted via the rear interface 17 to a second hosting unit (not represented in FIG. 7C).

Coding modules are well known in the art. They may have multiple encoding or decoding capabilities defined by multiple encoding and decoding standards. The coding module 304 may also have data transcoding capabilities. The coding module 304 may further be capable of performing data encryption or decryption. The encoding capabilities of a coding module mainly comprise the functionality of compressing the data of a signal, while the decoding capabilities mainly comprise the functionality of decompressing the data of a signal. The transcoding capabilities of a coding module consist in direct analog-to-analog or digital-to-digital conversion of one encoding format to another. Transcoding is generally implemented as a two-step process, in which the original data is decoded to an intermediate uncompressed format, which is then encoded into the target format.

In a particular aspect, encoding the data of a first received signal by the coding module 304 comprises compressing the data of the first signal. For example, the coding module 304 of the SFP unit 100 represented in FIG. 7D compresses the data of a first signal received from a hosting unit (not represented in FIG. 7D) via the rear interface 17. A second signal comprising the compressed data is outputted to a cable or to a fiber (not represented in FIG. 7D) via the front connector 20. The compression of the signal decreases the bandwidth required for transmitting the signal over the cable (or the fiber). The cable (or the fiber) may be shared with other equipment than the SFP unit 100, and thus compressing the data of the first signal via the coding module 304 is a more effective way of using the bandwidth provided by the cable (or the fiber).

In another particular aspect, decoding the data of a first received signal by the coding module 304 comprises decompressing the data of the first signal. For example, the coding module 304 of the SFP unit 100 represented in FIG. 7C decompresses the data of first a signal received from a cable or a fiber (not represented in FIG. 7C) via the front connector 20. A second signal comprising the decompressed data is transmitted to a hosting unit (not represented in FIG. 7C) via the rear interface 17.

In still another particular aspect, the first and second signals are video signals. The coding module 304 encodes or decodes the first video signal comprising the data in the first form into the second video signal having the data in the second form. In a particular embodiment, the second form is compatible with one of the following video standards: the JPEG standard, the JPEG 2000 standard, the H264 standard, the HEVC standard, the MPEG2 standard, the MPEG4 standard, etc. The first video signal (e.g. an HDTV signal) received by the SFP unit 100 is encoded by the coding module 304 into the second video signal having the data in the second form (e.g. a JPEG 2000 signal). In an alternative embodiment, the first form is compatible with one of the following video standards: the JPEG standard, the JPEG 2000 standard, the H264 standard, the HEVC standard, the MPEG2 standard, the MPEG4 standard, etc. The first video signal having the first form (e.g. a JPEG 2000 signal) received by the SFP unit 100 is decoded by the coding module 304 into the second video signal having the data in the second form (e.g. an HDTV signal).

In yet another particular aspect, and referring now to FIG. 7G, at least one signal processing unit 204 on the board 200 may pre-process the first signal received by the SFP unit 100 into a second signal, before the coding module 304 of the chipset 300 encodes or decodes the data of the second signal having the first form into the data having the second form. Alternatively or concurrently, at least one signal processing unit 205 on the board 200 post-processes the data of a third signal generated by the coding module 304 of the chipset 300 into a fourth signal outputted by the SFP unit 100. The third signal comprises the data in the second form generated by the coding module 304 through processing of the second signal having the data in the first form. As mentioned previously, various types of signal processing units 204 or 205 may be used in the SFP unit 100, including for example, and without limitations, the following functionalities: Analog to Digital Conversion (ADC), Digital to Analog Conversion (DAC), optical to electrical conversion, electrical to optical conversion, serializing, deserializing, signal re-clocking, signal reshaping or reconditioning, signals combination or separation, etc.

In still another particular aspect, the programmable processing component 304 may include more than one coding module. For instance, referring now to FIG. 7H, a first coding module of the chipset 300 may encode or decode the data of the first signal received by the front connector 20 and a second coding module of the chipset 300 may encode or decode the data of the second signal received by the front connector 21. The third and fourth signals respectively resulting from the encoding or decoding of the first and second signals are outputted by the rear connector 17. This example in relation to FIG. 7H is for illustrations purposes only. In another particular embodiment (not represented in FIG. 7H), a first coding module of the chipset 300 may encode or decode the data of a first signal received by the rear connector 17 and a second coding module of the chipset 300 may encode or decode the data of a second signal also received by the rear connector 17. The third and fourth signals respectively resulting from the encoding or decoding of the first and second signals are outputted respectively by the front connectors 20 and 21.

Furthermore, a single coding module 304 may implement simultaneously an encoding functionality and a complementary decoding functionality. Such a dual mode coding module is capable of encoding the data of a first signal having a first form into a second signal having a second form, and decoding the data of a third signal having the second form into a fourth signal having the first form.

In a particular embodiment, a plurality of programs comprising encoded video and corresponding audio data are received via a single channel of a SDI connector (e.g. 20) on the front panel 18 of the SFP unit 100. The decoding of the video and audio data for the plurality of programs is performed by the coding module 304 of the SFP unit 100.

Alternatively, the plurality of programs comprising encoded video and corresponding audio data are transmitted via a single channel of a SDI connector (e.g. 20) on the front panel 18 of the SFP unit 100. The encoding of the video and audio data for the plurality of programs is performed by the coding module 304 of the SFP unit 100.

Although the coding modules 304 of the present disclosure have been described with encoding or decoding capabilities of various types of video signals (optionally in combination with corresponding audio signals), the coding modules 304 may also encode or decode other types of signals, such as for example telecommunication signals.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
   a housing having specific standardized dimensions and adapted to being inserted into a chassis of a hosting unit;
   a board entirely located in the housing comprising at least two electro-mechanical components; and
   a mezzanine chipset entirely located in the housing comprising:
      at least two electro-mechanical components for removably attaching the mezzanine chipset to the board, each electro-mechanical component of the mezzanine chipset collaborating with a corresponding electro-mechanical component of the board for simultaneously providing a mechanical anchor and an electrical connection between the mezzanine chipset and the board; and
      a programmable processing component for processing a signal transmitted by the board via the electrical connection between the board and the mezzanine chipset;
   wherein the mezzanine chipset is superposed to the board, a lower horizontal surface of the mezzanine chipset covering at least partially an upper horizontal surface of the board, the at least two electro-mechanical components of the board extending upwardly from the upper horizontal surface of the board towards the lower horizontal surface of the mezzanine chipset, the at least two electro-mechanical components of the mezzanine chipset extending downwardly from the lower horizontal surface of the mezzanine chipset towards the upper horizontal surface of the board.

2. The standardized hot-pluggable transceiving unit of claim 1, wherein the programmable processing component of the mezzanine chipset comprises a Programmable Logic Device (PLD).

3. The standardized hot-pluggable transceiving unit of claim 2, wherein the PLD consists of a Field-Programmable Gate Array (FPGA).

4. The standardized hot-pluggable transceiving unit of claim 1, wherein the programmable processing component of the mezzanine chipset comprises at least one of the following: an Application-Specific Integrated Circuit (ASIC), and a processor.

5. The standardized hot-pluggable transceiving unit of claim 1, wherein the board comprises at least one signal processing unit.

6. The standardized hot-pluggable transceiving unit of claim 1, wherein the electro-mechanical components of the board consist in female electrical connectors, and the electro-mechanical components of the mezzanine chipset consist in corresponding male electrical connectors for connection therebetween.

7. The standardized hot-pluggable transceiving unit of claim 1, wherein the electro-mechanical components of the board consist in male electrical connectors, and the electro-mechanical components of the mezzanine chipset consist in corresponding female electrical connectors for connection therebetween.

8. The standardized hot-pluggable transceiving unit of claim 1, wherein the board provides electrical power supply to the mezzanine chipset.

9. The standardized hot-pluggable transceiving unit of claim 1, wherein the transceiving unit comprises a plurality of mezzanine chipsets superposed to the board, the electro-mechanical components of each mezzanine chipset among the plurality of mezzanine chipsets collaborating with corresponding electro-mechanical components of the board for simultaneously providing a mechanical anchor and an electrical connection between the mezzanine chipset and the board.

10. The standardized hot-pluggable transceiving unit of claim 1, comprising a connector for receiving a signal, the signal being transferred from the connector to the board, further transferred from the board to the mezzanine chipset, and processed by the programmable processing component of the mezzanine chipset.

11. The standardized hot-pluggable transceiving unit of claim 1, comprising a connector for receiving a first signal, the first signal being transferred from the connector to the board and processed by a signal processing unit of the board into a second signal, the second signal being further transferred from the board to the mezzanine chipset and processed by the programmable processing component of the mezzanine chipset.

12. The standardized hot-pluggable transceiving unit of claim 1, wherein the programmable processing component of the mezzanine chipset generates a signal, the signal being transferred from the mezzanine chipset to the board, and further transferred from the board to a connector of the transceiving unit for being outputted by the connector.

13. The standardized hot-pluggable transceiving unit of claim 1, wherein the programmable processing component of the mezzanine chipset generates a first signal, the first signal being transferred from the mezzanine chipset to the board and processed by a signal processing unit of the board into a second signal, the second signal being further transferred from the board to a connector of the transceiving unit for being outputted by the connector.

14. The standardized hot-pluggable transceiving unit of claim 1, wherein the transceiving unit receives a first signal comprising data in a first form, and the programmable processing component of the mezzanine chipset comprises a coding module for encoding or decoding the data of the first signal having the first form into data having a second form.

15. The standardized hot-pluggable transceiving unit of claim 14, wherein encoding the data of the first signal comprises compressing the data of the first signal.

16. The standardized hot-pluggable transceiving unit of claim 14, wherein decoding the data of first the signal comprises decompressing the data of the first signal.

17. The standardized hot-pluggable transceiving unit of claim 14, wherein the coding module further comprises at least one of the following capabilities: data transcoding, data encryption, and data decryption.

18. The standardized hot-pluggable transceiving unit of claim 14, wherein the transceiving unit outputs a second signal comprising the data in the second form, and the first and second signals consist in video signals.

19. The standardized hot-pluggable transceiving unit of claim 18, wherein one of the first form and the second form is compatible with one of the following standards: the JPEG standard, the JPEG 2000 standard, the H264 standard, the HEVC standard, the MPEG2 standard, and the MPEG4 standard.

* * * * *